United States Patent

Vincent

[11] 4,054,786
[45] Oct. 18, 1977

[54] RUNNING AVERAGE COMPUTER

[75] Inventor: Allen E. Vincent, Fort Wayne, Ind.

[73] Assignee: The United States of America as represented by the Secretary of the Navy, Washington, D.C.

[21] Appl. No.: 398,279

[22] Filed: Sept. 24, 1973

[51] Int. Cl.² .............................................. G06F 7/38
[52] U.S. Cl. .................................. 364/575; 324/77 A; 340/3 R; 364/734; 364/811
[58] Field of Search ............. 324/77 A; 235/156, 152, 235/180, 193; 340/3 R

[56] References Cited

U.S. PATENT DOCUMENTS

| | | | |
|---|---|---|---|
| 2,985,371 | 5/1961 | Landerer et al. | 235/180 |
| 3,182,181 | 5/1965 | Schumann | 235/156 |
| 3,410,993 | 11/1968 | Wood | 235/193 |
| 3,638,001 | 1/1972 | Gordon | 235/152 |
| 3,673,554 | 6/1972 | McAlpin | 340/3 R |
| 3,705,297 | 12/1972 | John | 235/152 |

Primary Examiner—Howard A. Birmiel
Attorney, Agent, or Firm—R. S. Sciascia; Henry Hansen

[57] ABSTRACT

A special purpose digital computer requiring minimal data storage capability for continually calculating the numerical average of a predetermined number of sampled data values. The average $I_{n+1}$ is calculated according to the equation:

$$I_{n+1} = \frac{nI_n + X_{n+1}}{n+1}$$

wherein
$I_n$ is the $n$th average stored; and
$X_{n+1}$ is the $(n+1)$ sample input.

A new value for the average of all previously sampled data is calculated upon receipt of each new sample thereby eliminating the storing of past sampled data values. The prior calculated average is multiplied by the previous number of data samples and the product is added to a new sample. The resultant sum is divided by the sequence number of the new sample and the quotient, which represents the new average, is placed in data storage.

9 Claims, 6 Drawing Figures

RUNNING AVERAGE COMPUTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to calculating apparatus usable in digital signal processing devices such as sonobuoys and particularly to a computer wherein a running average of a sequence of data samples may be calculated by adding each successive sample to the produce of the previous average and the previous number of samples and dividing the new total by the sequence number of the new sample.

In processing data signals of a digital processing system such as found in a sonobuoy, it is desirable to compute an average value of the input signals to the sonobuoy over a given period of time. In this manner short term transients as well as other unwanted sonic perturbations are normalized within the system and thus a more effective indicator of target signatures within an ensonified area over a predetermined period of time is provided. Prior art devices for computing the average of a given predetermined quantity of data samples stored and summed the various data samples which were eventually divided by the number of samples taken. Accordingly, prior art devices required relatively large memories and calculated an average value at the end of a predetermined time period. Sonobuoys, to be most effectively applied for their intended purposes, require light weight, compact assemblies that preferably house simplistic circuits consonant with the degree of effectiveness required.

SUMMARY OF THE INVENTION

Accordingly, it is an object of the present invention to provide a device for digitally computing a running average for a sequence of sampled data values while minimizing the data bit storage associated with the calculations. Another object is to minimize the size and weight of the present invention. Yet another object is to provide less complex circuitry for computing a running average of data samples and thus to increase device reliability.

Briefly, these and other objects are accomplished by a special purpose digital computer which continually calculates the numerical average $I_{n+1}$ of a predetermined number of successive sampled data values according to the equation:

$$I_{n+1} = \frac{nI_n + X_{n+1}}{n+1}$$

wherein $I_n$ is the $n$th average stored; and $X_{n+1}$ is the $(n+1)$ sample input.

A multiplier multiplies the old average by the previous number of averages computed. An adder adds the resultant product to a new data sample input and a divider divides the resultant sum by the sequence number of the new sample and provides a quotient which is stored to indicate the newly calculated average.

For a better understanding of these and other aspects of the invention, reference may be made to the following detailed description taken in conjunction with the accompanying drawings.

BRIEF DESCRIPTION OF THE DRAWINGS

FIG. 4b is a graph of a portion of a spectral analysis of the next consecutive sweep to the sweep of FIG. 3 and within the same frequency range of FIG. 4a.

DESCRIPTION OF THE PREFERRED EMBODIMENT

Figure 1:
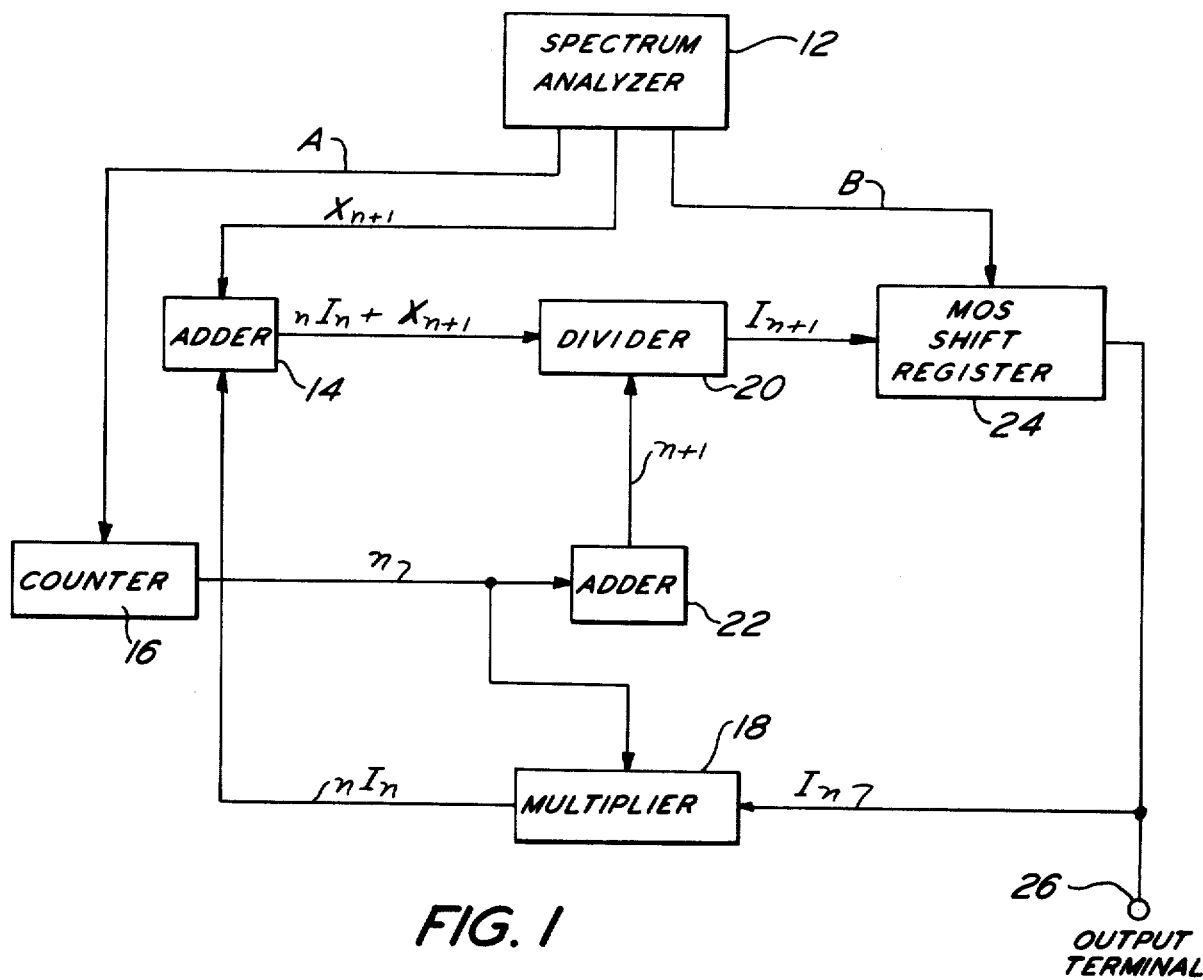
FIG. 1 is a block diagram of a data processing system according to the present invention.
Figure 2:
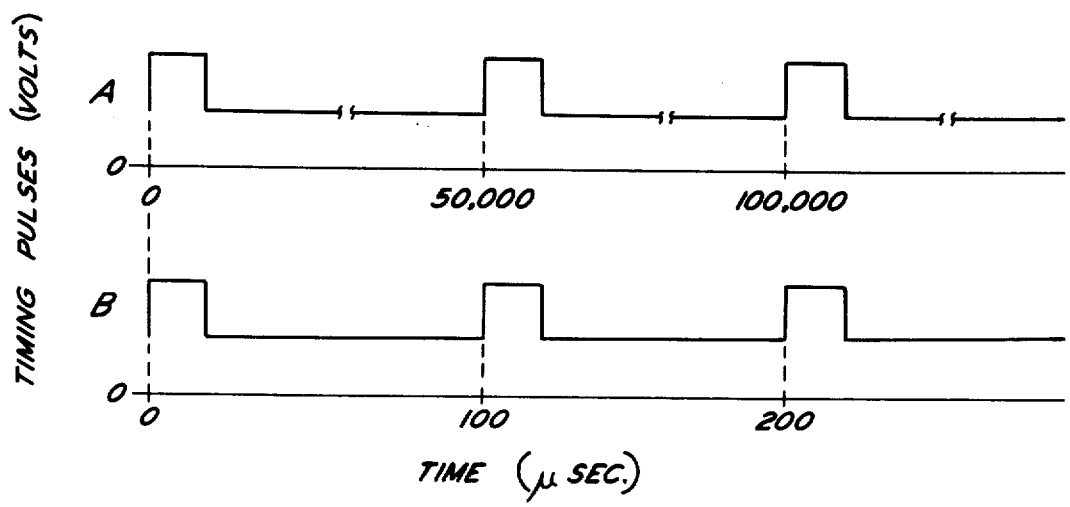
FIG. 2 is a diagram of typical timing pulses as applied in the system of FIG. 1.
Figure 3:
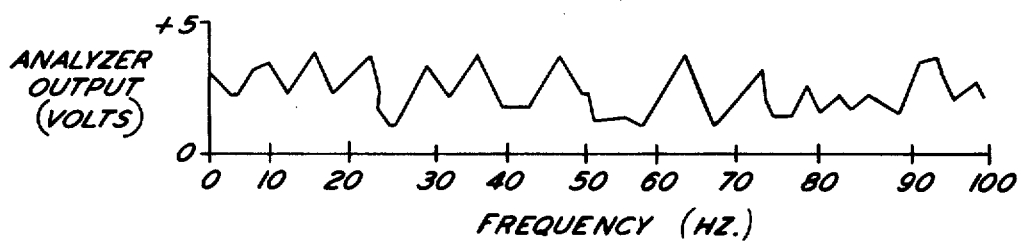
FIG. 3 is a graph of a spectral analysis of an underwater sound sample as applied to the system of FIG. 1.

Referring now to FIG. 1 of the drawing, a block diagram of one embodiment of the invention is illustrated for processing a running average of spectrum analyses energy levels from detected sonar samples. A conventional spectrum analyzer 12 periodically analyzes a predetermined number of consecutive sonar samples throughout a predetermined range of frequencies, and produces digital output signals by means of an analog to digital converter within the analyzer which are indicative of the energy level in discrete frequency cells throughout the frequency range. In the illustrated embodiment, a complete sweep of sonar samples in analyzed ever 50 milliseconds over a spectral range of 0 to 100 Hz. with a frequency resolution of 0.2 Hz. per cell. Consequently, there are 500 cells per analysis sweep, and the energy level of each cell is represented by a 100 $\mu$second data bit word in the sample output signal. The analyzer 12 provides a sweep trigger pulse A every 50 milliseconds at the start of each sweep, and a cell trigger pulse B ever 100 $\mu$seconds at the start of each frequency cell, as shown in FIG. 2. FIG. 3 is a graphic representation of a single sweep analysis of the analyzer 12. As can be seen from an enlargement in FIG. 4a, it is an analog signal of voltage which varies in steps with time, the voltage amplitude being proportional to the energy level with each step representing a frequency cell.

The spectrum analyzer 12 has a data sample output connected to one input of a first adder 14, a sweep trigger output connected to the input of a counter 16 and a cell trigger output connected to the shift input of an MOS shift register 24. A second input of the adder 14 is connected to receive an output for a multiplier 18. The output of the adder 14 is connected to one input of a divider 20. The counter 16 is connected to provide a common output to a first input of the multiplier 18 and an input to a second adder 22. The output of adder 22 is connected to a second input of the divider 20. The output of the divider 20 is connected to the input of a recirculating MOS shift register 24 which supplies common outputs to both a second input of the multiplier 18 and an output terminal 26.

The operation of the invention will now be described with reference to FIGS. 1-4 of the drawings. In order to explain a simple processing example within the operation of the invention, each of the information cells within every sweep will be assumed to supply an energy value which is encoded into four data bits. Therefore, one complete sweep will occupy two thousand bit storage spaces in the recirculating shift register 24.

Figure 4A:
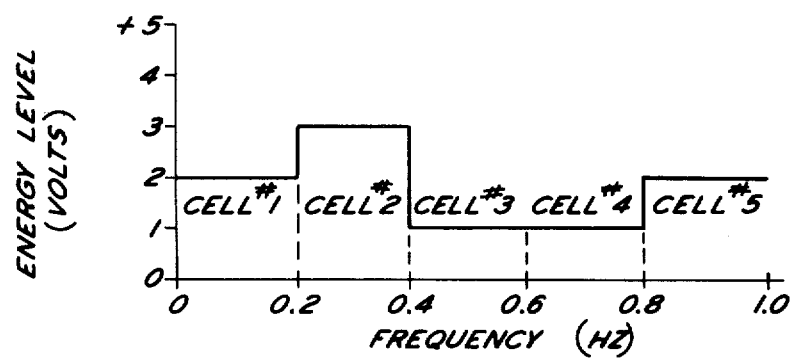
FIG. 4a is an enlarged, more detailed view of a 1 Hz portion of the graph of FIG. 3.
Figure 4B:
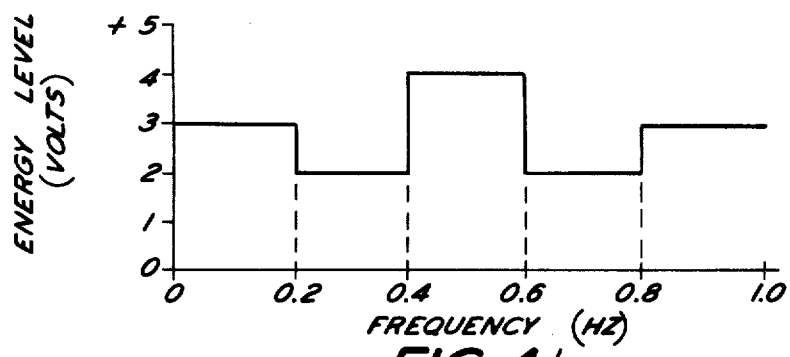
Figure 4C:
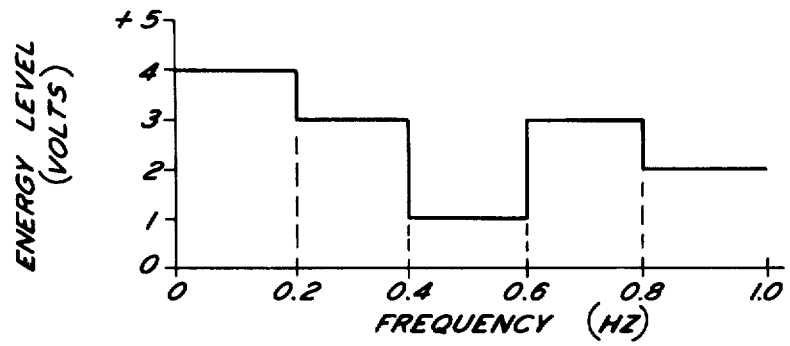
FIG. 4c is a graph of a portion of a spectral analysis of the next consecutive sweep to the sweep of FIG. 4b.

Assume that the shift register is clear and that the first output sample $X_{n+1}$ from sweep No. 1 in FIG. 4a is about to be processed. Since there are no averages presently stored in the shift register 24, the counter 16 is triggered by the sweep trigger A in FIG. 2 to a first count of $n=0$. When the first sample output $X_1$ representing the energy level of cell No. 1 in sweep No. 1 is presented at the analyzer output, the cell trigger output B as shown in FIG. 2 causes the recirculating shift register 24 to shift four bits and thus prepare the register 24 to load the first newly calculated average $I_1$ in the first four bit positions. As these four bit positions circulate through the register, the multiplier 18 receives these bits indicative of the old stored average $I_o$ for cell No. 1. Since $I_o = 0$, the second input to the adder 14 is zero. Adder 14 then accepts the digitally encoded 2 volt sampled level from cell No. 1 of sweep No. 1 as shown in FIG. 4a and transmits the output sum to the input of the divider 20. Adder 22 increments the output count $n$ by one and transmits the number one to the second input of the divider which divides the sample output $X_1$ by the quantity $(n + 1)$ and places the new average $I_1$ in the first four bit locations of the register 24. In this particular instance, the new average $I_1$ will be a four bit digital indication of a 2 volt average energy level in cell No. 1. Sample outputs from the remaining cells of sweep No. 1 are similarly processed. At the beginning of the next sequenced sweep No. 2, there are 500 averages stored for the prior sweep No. 1. The sweet trigger output A will cause the counter to update to $n = 1$. Bits 1, 2, 3 and 4 within the register 24 will have also cycled to the first four input positions of the register on command from the cell trigger output B of the analyzer 12. While cycling through the register, the stored average $I_1$ will be extracted by the first input of the multiplier 18 which multiplies the stored average by $n = 1$ and transmits this value $nI_n$ to the adder 14. The adder 14 accepts the first cell sample output from sweep No. 2 and adds the encoded 3 volt energy level as shown in FIG. 4b to the encoded value of 2 volts on the product input. The resultant encoded sum of 5 volts is now applied to one input of the divider 20 which divides this sum by the value $n + 1 = 2$ received from the adder 22. The new encoded average $I_2 = 2.5$ is placed in the first four bit locations of the register 24. New averages for the remaining cells of sweep No. 2 one similarly processed. At the end of processing all of the output samples from sweep No. 2, the last calculated average for cell No. 1 will be in the last four bit positions of the register 24. On beginning sweep No. 3, the counter 16 will be incremented by the sweep trigger output A of the analyzer 12 to $n = 2$. The last average $I_2 = 2.5$ is then received by the input to multiplier 18 as the register is again shifted four bits by the cell trigger B. Multiplier 18 multiplies $I_2$ times $n = 2$ and sends the encoded product value to an input of the adder 14. The adder 14 receives a new encoded sample $X_3$ from the analyzer 12 indicative of an energy level of 4 volts from cell No. 1 of sweep No. 3 as shown in FIG. 4c. The encoded sum of 9 volts is received by the divider 20 input and divided by the output from the adder 22. Divider 20 now transmits the encoded 3 volt average $I_3$ to the first four bit positions of the register 24. When the last sample of information from the last sweep has been processed, the contents of the shift register 24 are shifted out to be read at the output terminal 26. A typical application in a sonobuoy system would require that the processor operate for a period of five minutes before running averages are removed from the register.

It should be noted that the stored averages are placed in the register in a fixed word length. Although the present example shows a four bit word, the accuracy of the desired result will dictate proper format and the processor will truncate the calculated averages to the length necessary to fit the register. The truncating of average values is permissible due to the ordinarily high number of sweeps processed. It may be mathmetically shown that as the value of $n$ increases, the degree of truncation can also proportionally increase so that substantial accuracy can be maintained. Since the value of $n$ is predetermined, the accuracy of system calculations can be easily predicted. This method thus avoids the necessity of storing and summing lengthy decimal place sample outputs in order to preserve some measure of accuracy as known in the prior art.

The register 24 obviously must contain as many bit words as the spectrum analyzer 12 provides cells containing output energy level samples. In this preferred embodiment, the register 24 is a serial data device as is the sample output from the analyzer. The register 24 can, for example, be easily constructed from a series of MOS shift registers in a manner well known to those skilled in the art. Similarly, the adders, divider, counter and multiplier can be constructed from conventional integrated circuitry commonly available from commercial manufacturers such as Motorola, Fairchild or Texas Instruments.

Thus it may be seen that there has been provided a special purpose digital computer which requires minimal memory size for accurately calculating a running average of a large number of data samples and is relatively lightweight, compact and simple in its operation.

Obviously many modifications and variations of the invention are possible in light of the above teachings. It is therefore to be understood that within the scope of the appended claims the invention may be practiced than as specifically described.

What is claimed is:

1. A signature recognition system for minimizing the effects of spurious variations of background noise, comprising, in combination:

analyzer means for periodically sampling the energy level in a frequency spectrum of an input signal for providing a digital output representative of the energy level within discrete frequency cells of said spectrum, and for providing a pulse at the beginning of each sampling period;

summing means having first and second inputs, said first input connected to receive said analyzer means output, and for providing an output representative of the sum of said first and second inputs;

dividing means having first and second inputs, said first input connected to receive the summing means output and providing an output representative of the average energy level of each of said foregoing cells;

storage means having an input connected to receive the dividing means output, and for providing an output representative of the average energy levels stored therein;

counting means connected to receive said pulse for providing an output indicative of the cumulative number of the sampling periods, said counting means output being connected to said dividing means second input; and multiplying means having a first input connected to receive the storage means output, and a second input connected to receive said counting means output for providing an output representative of the product of the inputs, and said multiplying means output being connected to the summing means second input.

2. A digital processing system according to claim 1 wherein said dividing means further comprises:

an adder having an input connected to receive said dividing means second input and providing an output representative of a number one more than said second input; and a divider having first and second inputs, said first input connected to receive said dividing means first input and said second input connected to receive the adder output for providing said dividing means output.

3. A digital processing system according to claim 2 wherein said analyzer means further provides a pulse signal at the beginning of each frequency cell.

4. A digital processing system according to claim 3 wherein said counting means output is zero for the first count.

5. A digital processing system according to claim 4 wherein said storage means is a recirculating shift register.

6. A digital process for averaging the energy levels of corresponding ones of a repetitive series of input signals, comprising, in combination:

summing means having first and second inputs, said first input for receiving respective ones of said input signals, and for providing an output representative of the sum of said first and second inputs;

dividing means having first and second inputs, said first input connected to receive the summing means output and providing an output representative of the average energy level of each of said input signals;

storage means having an input connected to receive the dividing means output, and for providing an output representative of the average energy levels stored therein;

counting means for receiving a pulse once each repetition of said series for providing an output indicative of the cumulative number of said repetitions, said counting means output being connected to said dividing means second input; and multiplying means having a first input connected to receive the storage means output, and a second input connected to receive said counting means output for providing an output representative of the product of the inputs, and said multiplying means output being connected to the summing means second input.

7. A digital process according to claim 6 wherein said dividing means further comprises:

an adder having an input connected to receive said dividing means second input and providing an output representative of a number one more than said second input; and a divider having first and second inputs, said first input connected to receive said dividing means first input and said second input connected to receive the adder output for providing said dividing means output.

8. A digital process according to claim 7 wherein said counting means output is zero for the first count.

9. A digital process according to claim 8 wherein said storage means is a recirculating shift register.

* * * * *